United States Patent [19]
Biehl et al.

[11] Patent Number: 5,486,217
[45] Date of Patent: Jan. 23, 1996

[54] CELLULOSIC COMPOSITION

[76] Inventors: Brent G. Biehl, P.O. Box 30 B;
Michael J. Biehl, P.O. Box 81, both of Paradise, Mich. 49768

[21] Appl. No.: 965,499

[22] Filed: Oct. 23, 1992

[51] Int. Cl.$^6$ .................................. C10L 5/06; C10L 5/40
[52] U.S. Cl. .................. 44/597; 44/590; 44/594; 44/595; 44/606
[58] Field of Search ............................. 44/593, 594, 596, 44/597, 605, 606

[56] References Cited

U.S. PATENT DOCUMENTS

| | | | |
|---|---|---|---|
| 1,580,299 | 4/1926 | Holdaway | 44/590 |
| 2,175,113 | 10/1939 | Fischer | 47/59 |
| 2,916,365 | 12/1959 | Smith | 44/603 |
| 4,060,396 | 11/1977 | Burton | 44/531 |
| 4,324,561 | 4/1982 | Dean et al. | 44/589 |
| 4,357,780 | 11/1982 | Ball | 47/56 |
| 4,369,054 | 1/1983 | Shinholster, Jr. et al. | 71/25 |
| 4,530,700 | 7/1985 | Sawyer et al. | 44/606 |
| 4,564,368 | 1/1986 | Sawyer et al. | 44/606 |
| 4,670,018 | 6/1987 | Cornwell | 44/535 |
| 4,702,746 | 10/1987 | Finch | 44/530 |
| 4,720,935 | 1/1988 | Rogers et al. | 47/56 |
| 4,824,352 | 4/1989 | Hadley et al. | 425/168 |
| 4,874,396 | 10/1989 | McLeod | 44/589 |
| 5,023,097 | 6/1991 | Tyson | 426/271 |
| 5,062,954 | 11/1991 | Leedy et al. | 210/502.1 |
| 5,244,472 | 9/1993 | Simmons | 44/505 |

FOREIGN PATENT DOCUMENTS

| | | |
|---|---|---|
| 2547831 | 12/1984 | France . |
| 3041863 | 6/1982 | Germany . |
| 2186922 | 7/1990 | Japan . |
| 0041299 | 9/1990 | Japan . |
| 3130013 | 6/1991 | Japan . |
| 1458211 | 12/1976 | United Kingdom . |

*Primary Examiner*—Richard L. Raymond
*Assistant Examiner*—Deborah Lambkin
*Attorney, Agent, or Firm*—John G. Chupa

[57] ABSTRACT

A cellulosic composition 42 is provided which may be used as a charcoal briquette replacement, germination medium, oil and animal excretion absorbent, or as a source of nourishment.

20 Claims, 5 Drawing Sheets

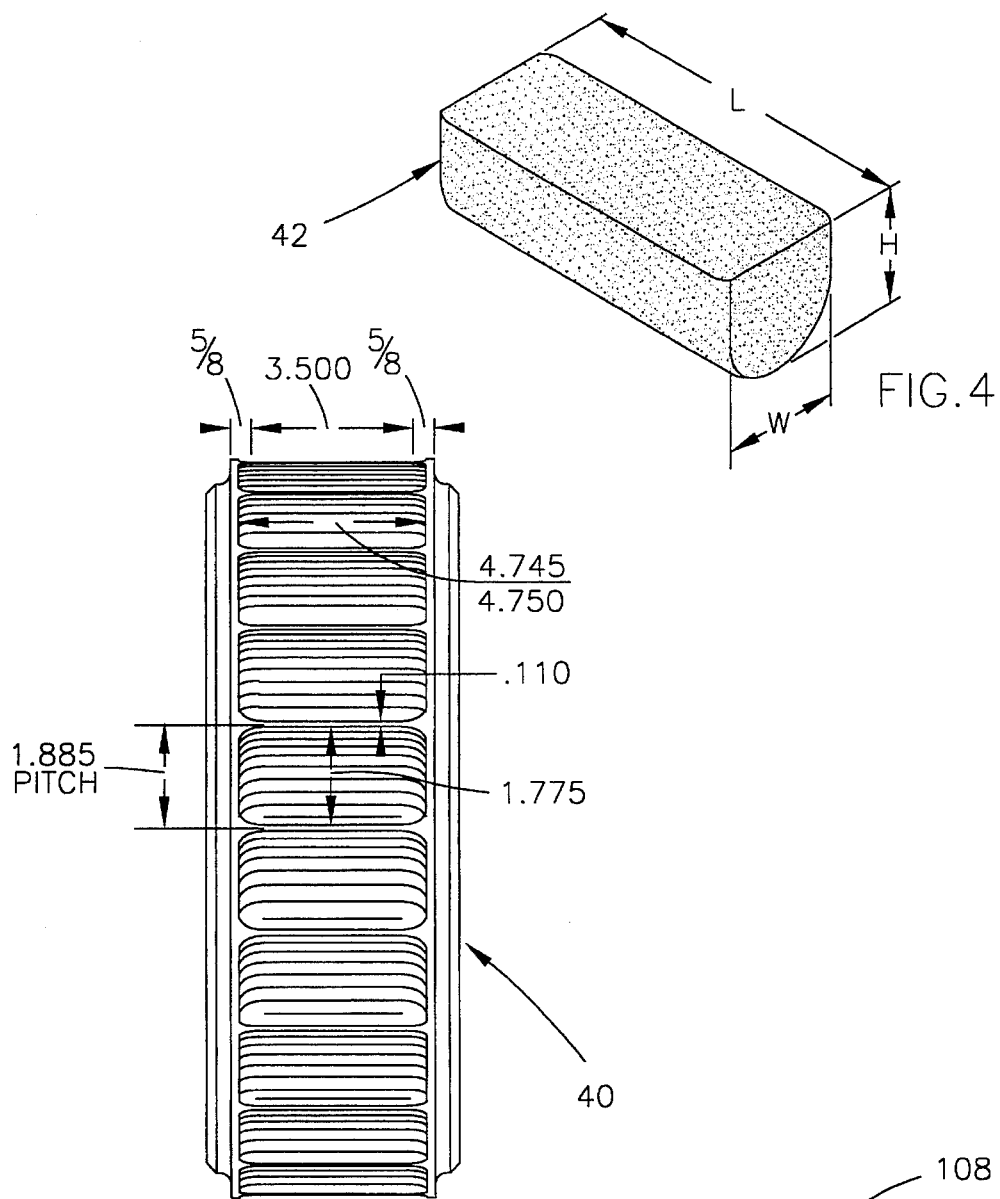
FIG. 4
FIG. 5
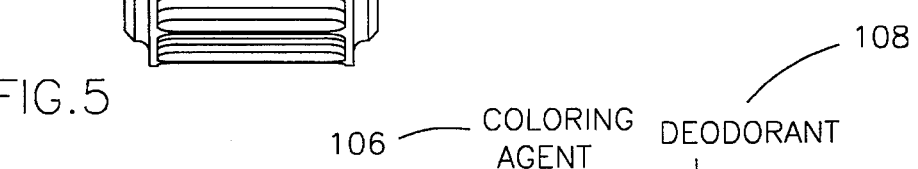
FIG. 6

CELLULOSIC COMPOSITION

FIELD OF THE INVENTION

This invention relates to a cellulosic composition, and more particularly to a composition which may be made from a wide variety of cellulosic materials and which is effective to germinate plants, to absorb oil and animal excretions, to provide heat, and to provide nourishment.

BACKGROUND OF THE INVENTION

Briquetted charcoal is currently and extensively used as a cooking and heating fuel. While effectively generating heat, briquetted charcoal, when combined with lighter or starter fluid or fat, emits fumes which may be inhaled by those in the surrounding area and which are absorbed into the cooked food, thereby being further introduced into the body. It is suspected by many health professionals and scientists that those fumes are harmful and carcinogenic. There is therefore a need to provide a heating and cooking fuel, effective to produce a desired amount of heat while substantially reducing the amounts and levels of the harmful charcoal-produced fumes.

Current biodegradable germination mediums are used to promote the growth of young plants and seedlings. While effective, many of these mediums contain organisms which infectiously destroy the very plants and seedlings whose growth they are designed to promote. One such pathogen is commonly referred to as "damping-off" fungi. In order to prevent such destruction from occurring, non-biodegradable mediums such as gypsum rock wood and vermiculite are used. While these mediums are germinatically effective, they must be later processed, as waste, thereby increasing cost and complexity to the germination process. There is therefore a need to provide a germination medium which is biodegradable, is effective to promote the growth of young plants and seedlings, and which provides substantially little or none of the harmful infectiously destructive affects on the young plants and seedlings which are associated with current biodegradable germination mediums.

Oil contaminated water is usually cleaned by use of relatively expensive microorganisms which are adapted to consume the oil; by use of agents which chemically interact with the oil and produce a non-biodegradable compound which is naturally dispersed throughout the water and which is difficult to later collect and dispose of; or by manually absorbing the oil by use of "sponge-like" materials. Such manual absorption being very inefficient and impractical for large areas, but having the advantage of allowing for extraction of the spilled oil for later use. No current product or technique is known which allows the oil to be easily and efficiently removed from water by a biodegradable material and which allows the absorbed oil to be later reclaimed. There is therefore a need to provide a biodegradable substance which absorbs the spilled oil and which allows the absorbed oil to be recovered and later used.

SUMMARY OF THE INVENTION

It is a first object of this invention to provide a cellulosic composition which is effective to selectively produce a certain and predetermined amount of heat.

It is a second object of this invention to provide a substantially biodegradable cellulosic composition which is effective to germinate young plants and seedlings.

It is a further object of this invention to provide a substantially biodegradable cellulosic composition which is effective to selectively absorb oil and animal excretions, and which is further effective to allow the absorbed oil to be recovered.

According to one aspect of this invention, a method for making a cellulosic composition is provided. The method comprises the steps of obtaining a quantity of wood particles, each of the wood particles having a certain moisture content; heating the wood particles to remove a predetermined and certain percentage of the moisture content; pulverizing the dried particles; heating the pulverized particles effective to remove a second predetermined and certain percentage of the moisture content therefrom; mixing the pulverized particles as the particles are heated; compacting the mixed and pulverized particles at a predetermined and certain temperature and at a certain and predetermined compacting force; and compacting the mixed and pulverized particles at a second compacting force effective to form the particles into a certain and predetermined shape.

According to a second aspect of this invention, a wood-based composition is provided. The composition comprises a certain quantity of cellulosic particles which are initially compacted and concurrently heated with a certain predetermined respective compacting force and temperature, and which are thereafter compacted at a second and greater compacting force.

These and other features, objects, and advantages of the invention will be apparent from a reading of the following specification and by reference to the claims taken in combination with the appended drawings.

BRIEF DESCRIPTION OF THE DRAWINGS

FIG. 4 is a perspective view of the composition produced by the method shown in FIG. 1;

FIG. 5 is a view taken in the direction of arrow 5 of FIG. 1;

FIG. 6 is a block diagram of a method used to produce animal excretion absorption material according to the teachings of the preferred embodiment of this invention;

DETAILED DESCRIPTION OF THE PREFERRED EMBODIMENT

(I). THE PROGRESS

Figure 1:
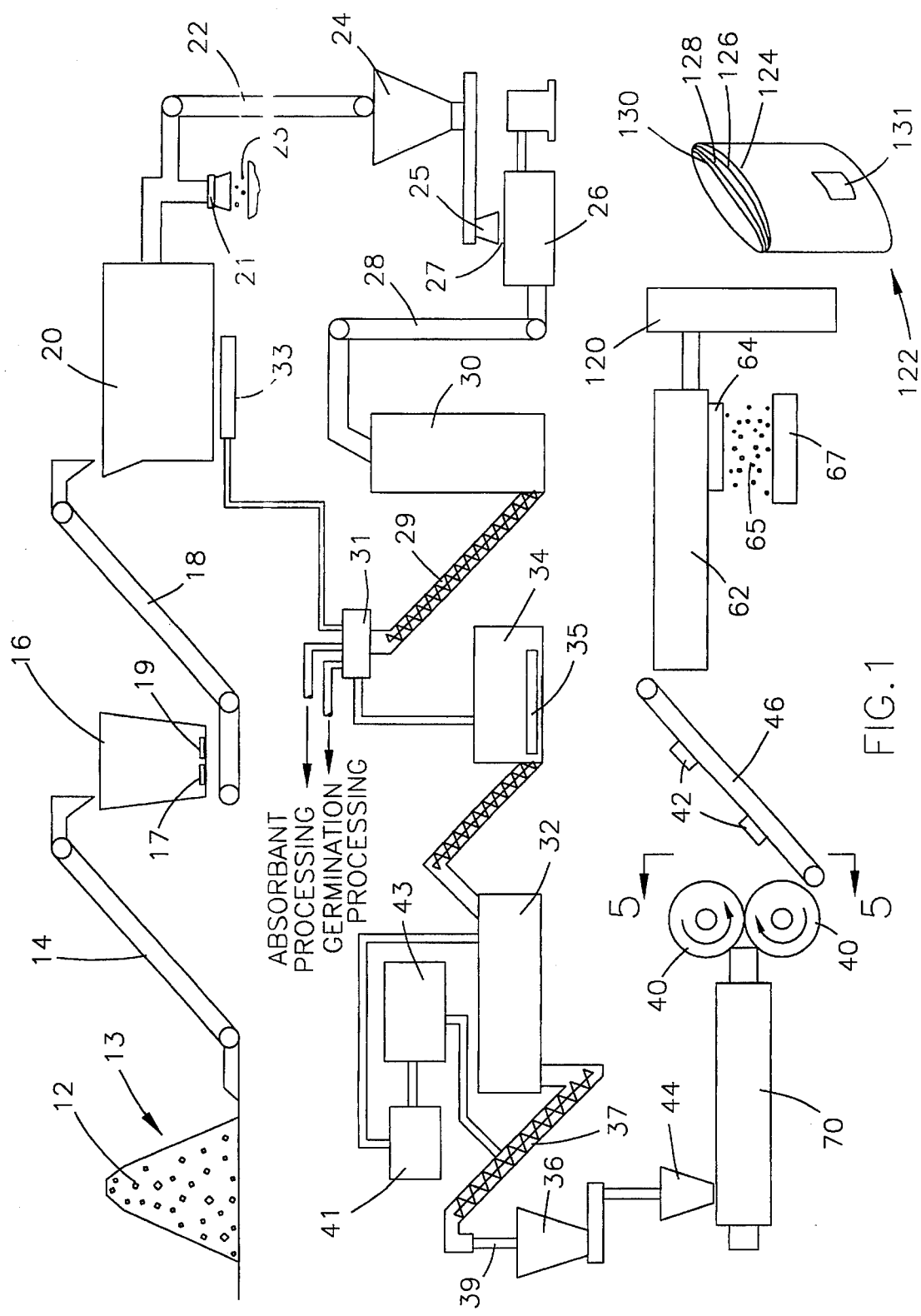
FIG. 1 is a block diagram illustrating a method of producing a cellulosic composition according to the teachings of a preferred embodiment of this invention.

Referring now to FIG. 1, there is shown a process 10 which is adapted to produce a cellulosic composition, according to the teachings of the preferred embodiment of this invention. As shown, a quantity of cellulosic particles or chips 12, such as sawdust, wood chips, branches, and/or bark are initially collected into a pile 13. Normally, these particles 12 each contain a certain and predetermined amount of moisture. However, if the particles are dry, a thin coating of liquid (such as water) is supplied to the surface of each of the particles 12. Such coating is made approximately one to approximately two centimeters thick.

According to the teachings of the preferred embodiment of this invention, the types of particles 12 are chosen according to the type of produced cellulosic composition and application that the produced product is desired to be used within. For example, if the produced composition is to be used as a cooking or heating fuel, the preferred particles comprise hardwood chips, such as oak, maple or beech. For germination and oil and animal excretion absorption applications, hardwood particles such as maple or beech are used. For nourishment purposes, corn, wheat, barley, rye and/or sugarcane particles may be used. It is further and alternatively contemplated by this invention that combinations of appropriate particles may be used in each of these applications. For example, combinations of hardwood and softwood particles (such as aspen) may be used in the creation of a composition which effectively provides heat, while combinations of softwood particles may be used in the production of absorption products. In nourishment applications, combinations of sugar, rye, wheat, corn, barley, and/or other edible cellulosic materials may be used.

Particles 12 are placed into surge bin 16 by a typical front end loader (not shown) or by typical conveyor assembly 14. In the preferred embodiment of the invention, bin 16 includes two bottom screws 17, 19 which are adapted to cooperatively mix particles 12, effective to ensure that the moisture content of each of the particles is substantially identical and to further reduce some of the "clumps" or groups of particles 12 in order to efficiently allow further processing to be achieved. In the preferred embodiment of this invention, each screw 17, 19 comprises a right hand screw having an approximate diameter of 12 inches. Moreover, the twin screws 17, 19 are adapted to operate at a variable speed in order to ensure that output particles are slowly placed upon conveyor 18 when dryer 20 is "ramping up" in temperature, and later placed upon conveyor 18 at a relatively greater speed as dryer 20 reaches its normal operating temperature. In this manner, it is substantially ensured that all of the particles entering dryer 20 will be heated to a certain and desired level.

As shown, conveyor assembly 18 transports particles 12 to dryer 20, which in the preferred embodiment of this invention comprises a three pass rotary drum dehydrator, manufactured by the MEC Corporation of Neodesa, Kans. and referred to as model SD105-32. According to the teachings of the preferred embodiment of this invention, dryer 20 is adapted to utilize hot gases to remove only about 85% to about 90% by weight of the moisture content of each of these particles in order to ensure that about 10% to about 15% of the moisture content (by weight) remain within particles 12. Such residual moisture has been found to be essential in allowing for particle "preheating" (to be later explained), and further ensures that some of these particles 12 may be used as fuel for dryer 20 (also to be later explained). Moreover, dryer 20 further includes, in the preferred embodiment of this invention, a typical heavy particle separator (i.e., a "foreign material trap") 21 which is adapted to collect stones and other heavy foreign objects 23, which may be immersed within particles 12. As the dried particles leave the dryer, such object collection substantially prevents damage to the various apparatuses used later in process 10.

The partially dried or dehydrated particles are transported, by typical conveyor assembly 22 to cyclone collector assembly 24 which, in the preferred embodiment of this invention, comprises a high efficiency negative pressure cyclone collector, which is adapted to separate the partially dried particles from the hot gases associated with dryer 20. Such gases may include steam, moisture laden air, and other usual combustion dryer gases. In the preferred embodiment of this invention, cyclone collector 24 is manufactured by the MEC Company of Neodesa, Kans. All collected particles are placed through a magnetic separator assembly 25 which, in the preferred embodiment of this invention, comprises a typical and commercially available cascaded magnet assembly which is adapted to remove metal particulates from particles 12. Assembly 25 further includes a typical and commercially available rotary feeder 27 with an air siphon separator which cooperatively inputs a substantially uniform amount of particles 12 to grinding and/or pulverizing assembly 26, and is further adapted to separate smaller foreign objects, such as stones, from particles 12. These smaller foreign objects were not collectably separated from particles 12 by collector 21.

In the preferred embodiment of this invention, assembly 26 comprises a hammermill, manufactured by the Jacobson Company of Minneapolis, Minn. and referred to as model 2436DC. More particularly, assembly 26 is adapted to ensure that output pulverized particles 12 each have a diameter of about ⅛ inch. These stringent particle diameter requirements have been found to be necessary in order to ensure that the produced cellulosic material remains bound, without the need for any external binders or fillers, and further ensures that some of the particles 12 may be fuelably used within dryer 20 without substantial sparking.

The processed particles 12 are transported, by a typical conveyor assembly 28, to a cyclone storage bin 30 which, in the preferred embodiment of the invention, comprises a commercially available silo manufactured by the Laidig Company and having a height of approximately 40 feet and a width of approximately 18.5 feet. It should be realized by one of ordinary skill in the art, that bin 30 is required for use in system 10 due to the fact that dryer 20 outputs particles at a greater speed than is processed by that portion of process system 10 receiving particles from assembly 26. These particles must therefore be temporarily stored for use by those portions of system 10 receiving particles from assembly 26.

The stored particles are transported by a typical screw conveyor 29 to a diverter valve 31 where the particles are selectively gated or diverted as fuel to the dryer burners 33 (each burner comprising a solid fuel burner which is manufactured by the McConnel Corporation and referred to as model H36); to metering or surge bin 34 for later processing as a heating substance in a manner to be described; for processing as animal excretion or oil absorbent; or for processing as a germination medium. All such later processing will now be described.

In the preferred embodiment of this invention, bin 34 includes a bottom screw assembly 35 which, in the preferred embodiment of this invention, comprises four variable speed right hand screws, each having a diameter of about 6 inches and a length of about 48 inches. Moreover, bin 34 is made to have substantially straight sides in order to prevent clumping or bridging of the contained particles 12. In the preferred embodiment of the invention, contained screw assembly 35 is adjusted at a predetermined speed which is substantially equal to the speed that particles are being received from silo 30 and is also normally less than the processing speed of assemblies 36, 40, and 70.

Particles exiting from bin 34 are input to pre-heating assembly 32 which, in the preferred embodiment of this invention, comprises a vibratory fluid bed heater which is commercially available from the Kinergy Corporation of Louisville, Ky. and which is referred to as a model KDFBD-12-SD. Alternatively, assembly 32 may be replaced or used in combination with a commercially available thermal screw having a length of approximately 20' and a diameter of about 24". According to the teachings of the preferred embodiment of this invention, preheater assembly 32 is adapted to heat the contained particles 12 to a temperature within the range of approximately 150° F. to approximately 250° F., while concurrently ensuring that each of the particles retain a moisture content of approximately 10% by weight. Particles 12 are output, through mixing assembly 37, to a surge and metering assembly 36, which is substantially similar to the surge and metering assembly 34. In the preferred embodiment of this invention, assembly 32 is adapted to receive material at a flow rate of approximately 3,000 pounds per hour.

Moreover, during the aforedescribed "preheating" process, small "dust-like" cellulosic particles are exhausted from assembly 32 and input to cyclone 41 (which is substantially similar to cyclone 24) and which is adapted to separate the "dust-like" and coarse particles from the airstream of the pre-heater 32. The separated particles are input to collector 43 which collects the exhausted particles and inputs them to mixer 37, which also receives the "preheated" particle output from assembly 32. These "dust" particles have been found essential in allowing the produced cellulosic composition to bind without the need for external binding agents. That is, it has been found that these collected "dust-like" particles are "bindingly" essential due to the fact that they provide for a greater overall particle size range which allows for greater cellulosic composition density. Moreover, particulate material having a diameter of less than about ⅛" (obtained from collector 67 which will be discussed or from other cellulosic sources) may be input to assemblies 41, 43, or directly to mixer 37 in order to provide such binding.

Additional cellulosic particles (of various types), binders, flavorings, colorants, or carbon compositions may also be added to mixer 37. In particular, carbon has been found to increase the overall "burn time" of the produced cellulosic composition while binders (such as starch and/or molasses) allow the particles to more fully bind. It should be emphasized that such binders or carbon are not essential to the cellulosic composition process of the preferred embodiment of this invention.

According to the teachings of the preferred embodiment of this invention, mixer 37 comprises a typical and commercially available screw having a diameter of approximately 9 inches and inclined at an angle of approximately 45 degrees with respect to the horizon. In this regard, mixer 37 mixes and conveys particles to typical and commercially available ceramic tube magnetic assembly 39 which is adapted to remove any extraneous and foreign metal objects contained within the particles. The particles output from assembly 39 are then input to surge and metering assembly 36.

Figure 2:
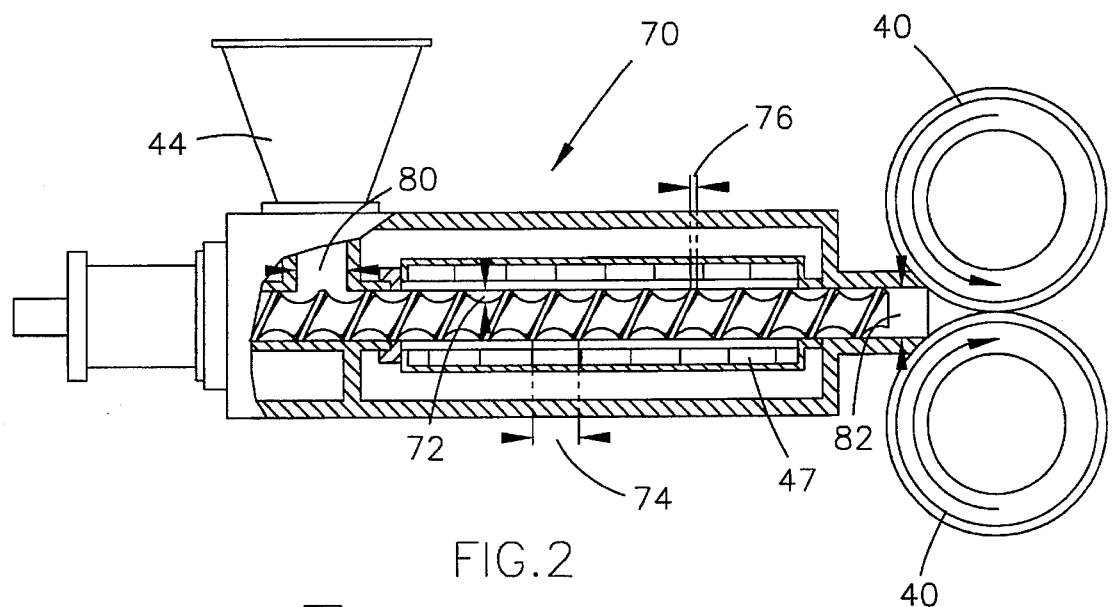
FIG. 2 is a side view of a first embodiment of the feeder screw shown in FIG. 1.

The material which is output from surge and metering assembly 36 is input into a typical and commercially available hopper 44 which is adapted to output the particles to the feeder screw assembly 70 (one embodiment of which is shown in FIG. 2). As shown best in FIG. 2, one embodiment of feeder screw assembly 70 comprises a screw having a groove depth 72 of about 1 inch, a pitch 74 of about 3¼ inch, and a land width 76 of about ⅜ inch, with an overall length of about 53¾ inches. Moreover, in this first feeder screw embodiment, screw 70 is gravity fed from hopper 44. It has been found that in order to prevent bridging or binding within the feeder screw feed hopper 44, the input choke diameter 80 should be no less than the screw width 82.

Figure 3:
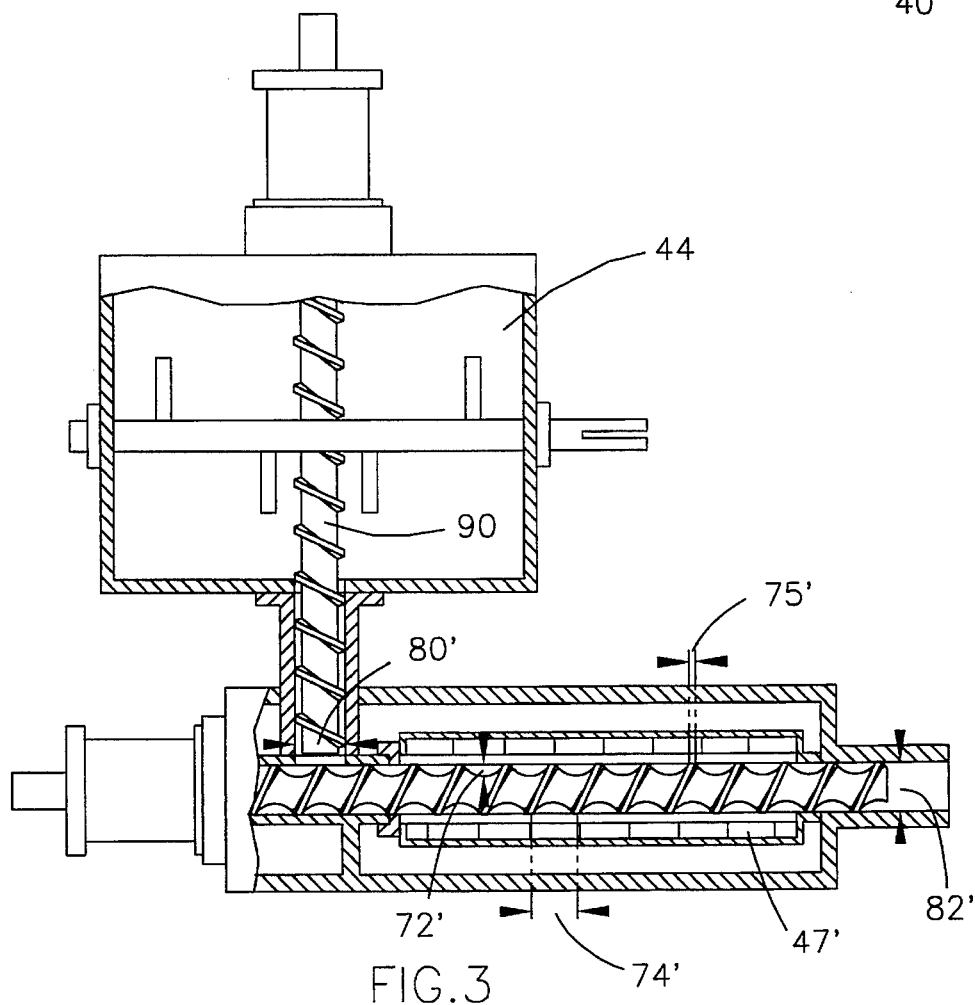
FIG. 3 is a top view of a second embodiment of the feeder screw, shown in FIG. 1.

In a second feeder screw embodiment shown in FIG. 3, the length of the screw 70' is substantially similar to screw 70, but the groove depth 72' equals about ¾ inch, the pitch 74' about 2¼ inch, and the land width 76' about ¼ inch. This second embodiment also differs from the screw assembly shown in FIG. 2 in that it is horizontally and co-planarly fed from a screw 90. As before, the choke diameter 80' should be no less than the screw width 82'. Such screw feeding has been found to be a more reliable method for transporting particles to screw 70 and 70' than simple gravity feeding.

Figure 10:
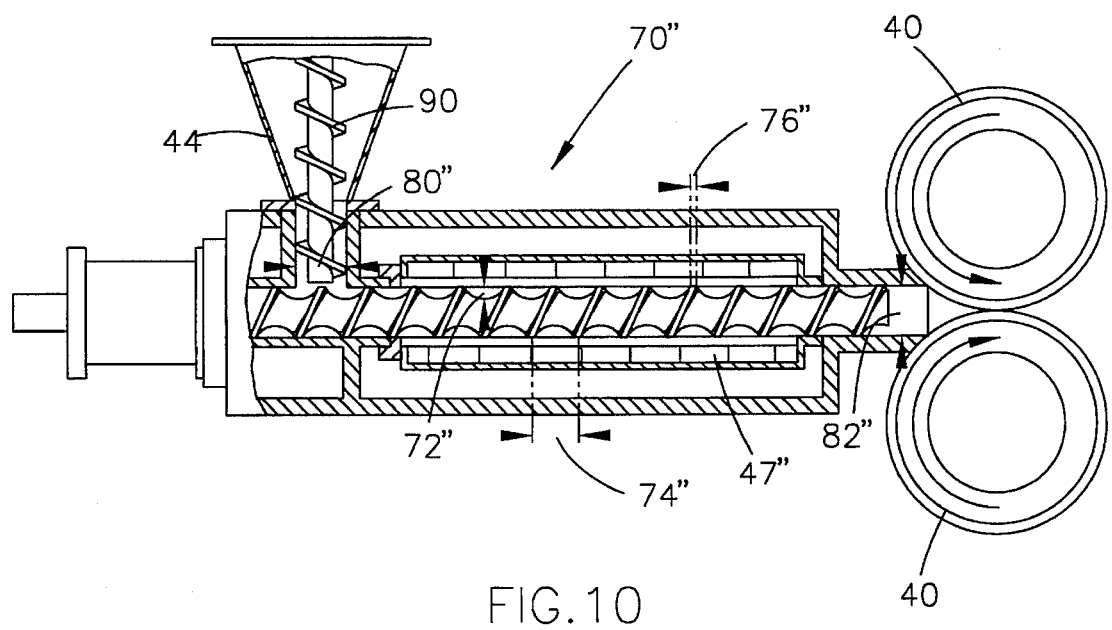
FIG. 10 is a side view of a third embodiment of the feeder screw shown in FIG. 1.

In a third screw assembly embodiment shown in FIG. 10, screw 70" differs from screw 70 only in that screw 70" is perpendicularly fed from a typical and commercially available screw 100 which is resident within hopper 44. Such a "screw feed" arrangement has been found to be more efficient and reliable than the embodiment shown in FIG. 2 as long as screw 100 is adapted to track or convey from the top of hopper 68 to the bottom of choke 80.

All of the screw embodiments 70, 70', and 70" further include respective and commercially available barrel-type heaters 47, 47', and 47" which are adapted to respectively surround the screws 70, 70', and 70" and to heat the material contained within the screw to an output temperature of about 250° F. Thus, feeder screw assemblies 70, 70', and 70" pre-compresses the cellulosic particulate material at an initial pressure of approximately 150 tons while concurrently heating the precompacted material at selectable and predetermined temperature. The relatively long screw length further increases the residence time of the material, and such pressure and temperature cooperatively plasticizes the material at approximately ⅔ of the distance down each of the screws toward dies 40. It is this plasticization process which causes the cellulosic material to bind without the need for binding agents, such as starch or molasses, and which further, as will be explained, allows for the production of a highly dense cellulosic composition.

The precompacted and plasticized material is input at a first certain and predetermined speed to a pair of conventional rolling dies 40 which apply a final compacting force of approximately 275 tons to the plasticized particles. Dies 40, in the preferred embodiment of the invention are adapted to output densified cellulosic material 42 in a "briquette" form on a typical conveyor assembly 46. In the preferred embodiment of the invention, rolls 40 have a diameter of about 18 inches and a roll turning speed of about three revolutions per minute which is substantially slower than the speed at which the rolls receive particle material from screw 70. Screw 70 turns at about 560 to about 750 revolutions per minute as it supplies material to rolls 40. Moreover, as best shown in FIG. 5, each roll 40 has corresponding pocket 60 of a width equal to about 4.75", a height of about 1.775", and a pitch of about 1.885".

Conventional charcoal briquetting rolls turn much faster than the rolls 40 of the preferred embodiment of this invention since the material that these prior rolls are densifying is not tightly bound and is often in paste form having a high liquid content. Applicants' material is highly bound before rolling. Hence, Applicants are able to utilize slow rolling speeds, relative to the speed of the feeder screw 70, which allows rolls 40 to more tightly densify the material than is presently possible in conventional charcoal briquetting machines. Such increased densification allows for longer burning time and greater absorption and germination properties compared to the cellulosic material being used in its natural "unprocessed" state, such as a virgin or naturally occurring wood fiber.

The output "briquette-shaped" cellulosic composition product 42 is cooled by a typical and commercially available vibrating cooling assembly 62. Extraneous cellulosic particulate material 65 is screened from cooling assembly 62 by means of screen 64 and collected by cellulosic particulate collector 67. Such screened material may be selectively input to mixer 37 or assemblies 41, 43 in a manner which has been previously described, or may be used to comprise germination, nourishment, and/or oil and animal excretion absorbing products in a manner and for a purpose which will be described. Additionally, these particles 65 may also be used as fuel for dryer 20 or as heat generators in a manner similar to that of particles 12, as earlier described.

The cold briquette-shaped products are bagged and packed by means of packing assembly 120, which in the preferred embodiment of this invention comprises a model AB-H-1 Northwest Single Hopper Autobagger which is commercially available and which is manufactured by Northwest Equipment Company of Yakima, Wash. In the preferred embodiment of this invention, each bag 122 includes several paper layers 124, 126 and 128 and one inside layer 130 having a polyethylene coating which Applicant has found to be effective to substantially prevent moisture and oxygen from contacting the contained cellulosic product. Moreover, each bag 122 includes a briquette starter 131, comprising some of the particles 65 or other wood fiber. In the preferred embodiment of this invention, this starter is substantially non-toxic when compared to traditional charcoal briquette starting materials such as lighter fluid.

As should be known to one of ordinary skill in the art, the briquette shape of the produced cellulosic composition may be selectively fixed and/or modified by means of modifications to roll dies 40. However, Applicant has found that the generally elongated and semi-circular shape, shown in the briquette 42 of FIG. 4 is optimal for particulate binding and heat generation. In the preferred embodiment of this invention, briquette 42 has a height "H" of about 2", a length "L" of about 5", and a width "W" of about 1.5". Accordingly, such shape is crucial to the use of such briquettes as briquetted charcoal replacements. Moreover, since only naturally occurring and biodegradable cellulosic material is included within cellulosic briquette 42, it should be apparent to one of ordinary skill in the art that briquette 42 is substantially non-pathogenic and non-carcinogenic and that extraneous and additional binders and/or chemicals, present within briquetted charcoal, are obviated. Moreover, since briquette-shaped composition 42 is made of only naturally occurring cellulosic materials, it is biodegradable.

It should be apparent that briquette 42 may be used in barbecues, gas grills or any other cooking or burning applications requiring food preparation. Moreover this product provides desired heat with little of the harmful side effects associated with briquetted charcoal and further provides a mild and highly desirable flavor to the food, not present or generated by common wood or other commercially flavoring additives or chips. Moreover, if burned in an oxygen starved atmosphere, briquette 42 will procure a flavoring smoke which imparts a non-acidic and mild flavor to food products.

Figure 9A:
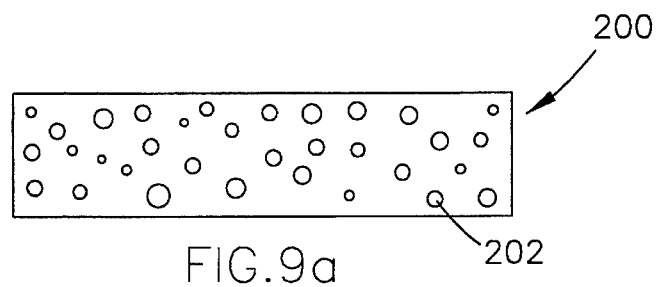
FIGS. 9(*a–b*) are respective illustrations of cellulosic cell structures before and after processing by the methodology of the preferred embodiment of this invention.
Figure 9B:
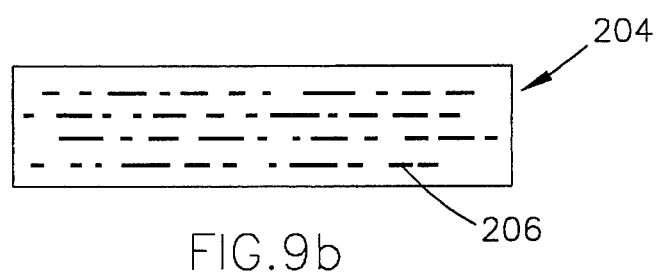

Referring now to FIGS. 9(*a–b*) there is shown a typical wood cell 200, before being processed by the methodology of the preferred embodiment of this invention. As shown, typical wood particle cell 200 (FIG. 9(*a*)) includes a pattern of air spaces or pockets 202 and is relatively dense. After processing cell 200 by the methodology shown in FIG. 1, cell 204 (FIG. 9(*b*)) is produced. As shown, cell 204 is much more dense than cell 200, with each air pocket 202 being collapsed into form 206. In this regard, the fibers comprising the fine product 42 are seen as elongated and torn while being greatly densified. Thus, process 10 greatly densifies the wood particles 12, which allows the processed cellulosic composition to serve as an excellent germination medium. To demonstrate the highly dense nature of the briquette-shaped composition 42, a typical 16 oz. glass was filled with tap water. One briquette 42 was placed on top of the water and immediately sunk to the bottom of the glass, unlike that which would occur with unprocessed wood or other cellulosic material. This experiment was repeated for several particles 65, all of which also sank to the bottom of the glass.

(II). GERMINATION MEDIUM

Applicant has further found that the addition of common tap water to briquette-shaped cellulosic composition 42 allows the biodegradable briquette to partially and/or completely reconstitute the densified cellulosic material into the various constituent fibers. Such water-based fiber reconstitution provides a very effective pathogen-free germination medium which is effective to promote the growth of young plants, seedlings and other vegetation. This feature is very useful since most biodegradable germination mediums impart "damping-off" fungi and other destructively infectious diseases to these plants and seedlings.

To verify this germination feature, an experiment was conducted using the produced cellulosic composition briquettes 42. In this experiment, a typical plant-growing tray 300 (FIG. 8) having thirty-six compartments 302 was used. Each of the compartments had dimensions of approximately 2"×2".

Each compartment 302 had a bottom opening for water drainage purposes and was filled with an approximately equal mixture (by volume) of tap water and the composition produced by process 10 in FIG. 1. The compartments were divided into six equal groups and each group was assigned cucumber; lima beans; pea; sweet corn; tomato; or zinnia seeds. These seeds were planted upon the surface of each compartment and covered with about ¼ inch of mae material produced by process 10 of FIG. 1. A typical stretch-wrap cover was further placed over each compartment, thereby preventing moisture evaporation. The layout of the tray is shown best in FIG. 8. Moreover, all of the seeds were packed for use in 1987. Since this experiment was performed in 1991, it was expected that seed growth would be retarded.

The tray was placed in a room having an average temperature in the range from about 60° F. to about 70° F. and was further westwardly situated in a manner that caused direct sunlight to be received throughout the tray during the afternoon hours. Fluorescent lights illuminated the trays only during time between about 9:00 a.m. to about 5:00 p.m. daily. The tray was rotated about 180° every two days. When germination occurred, the stretch-wrap was selectively removed from those containers having germinated seedlings, and the containers were filled with enough water to adequately provide bottom watering. The results of this germination experiment are shown in Table I below:

TABLE 1

GERMINATION SUMMARY

| | Packed | Percent Germination | Normal Germ. Period | Actual Germ. Period |
|---|---|---|---|---|
| Cucumber (SMR-18) | 1986 | 83% | about 10 Days | 2 Days |
| Lima Bean (Early Thorogreen Bush) | 1986 | 90% | about 14 Days | 2 Days |
| Sweet Corn (Iochief Hybrid Yellow) | 1986 | 92% | about 12 Days | 3 Days |
| Pea (Little Marvel) | 1986 | 83% | about 14 Days | 2 Days |
| Tomato (Beefsteak) | 1986 | 44% | about 14 Days | 7 Days |
| Zinnia (Giant Fantasy Mixed Colors) | 1985 | 100% | about 10 Days | 3 Days |

Graph I below illustrates the growth of these plants from a time just prior to germination to about one week after germination. It should be apparent to one of ordinary skill in the art that the growth and germination time affect, caused by the cellulosic composition of this invention are dramatic. As seen from the data included within Table I and Graph I, germination times decrease about 50 to about 80 percent, while growth increases are substantial. Such germination and growth affects will allow food to be produced much faster and allow for an efficient use of farmland.

GRAPH I

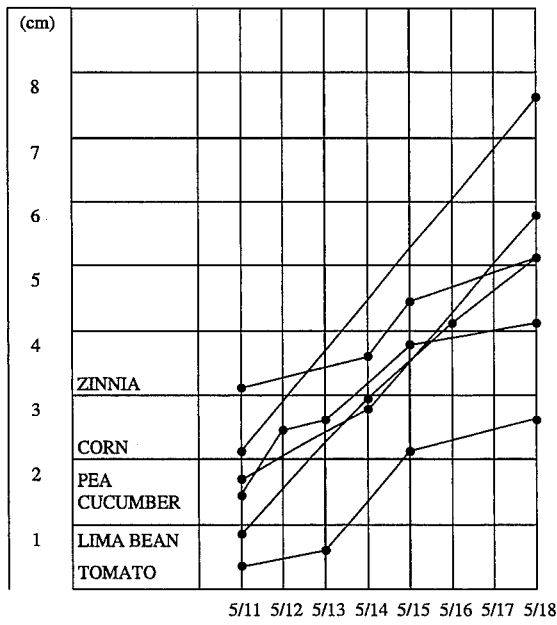

(III). ABSORBENT

Referring now to FIG. 6, there is shown process 100 which is performed on particles 12 as they are output from diverter valve 31 of FIG. 1. In the preferred embodiment of this invention, process 10 is to allow the particles to be useful as an animal excretion absorbent.

As shown, the dried particles 12 are directly output to a surge bin assembly 102 which, in the preferred embodiment of this invention, is substantially identical to assemblies 34 and 36 of FIG. 1. Alternatively, particles 12 may be output to a typical and commercially available aspirator such as model 6F42 manufactured by KICE Industries, Inc. of Wichita, Kans. The output of the aspirator (not shown) is input to assembly 102. The dust collected by the aspirator may be input to valve 31 or assemblies 41, 43. The output of assembly 34 is input to a typical mixer assembly 104 which is effective to mix a predetermined and certain amount of coloring agent 106 and deodorant 108 to the particles 12. The colored and deodorized particles 12 are then output to bagging and packaging assembly 120 (shown in FIG. 1). In this manner, the particles may cooperatively absorb animal excretions and replace traditional and non-biodegradable litter products. This biodegradable feature is very important in order to reduce environmental pollution.

Figures 7, 8:
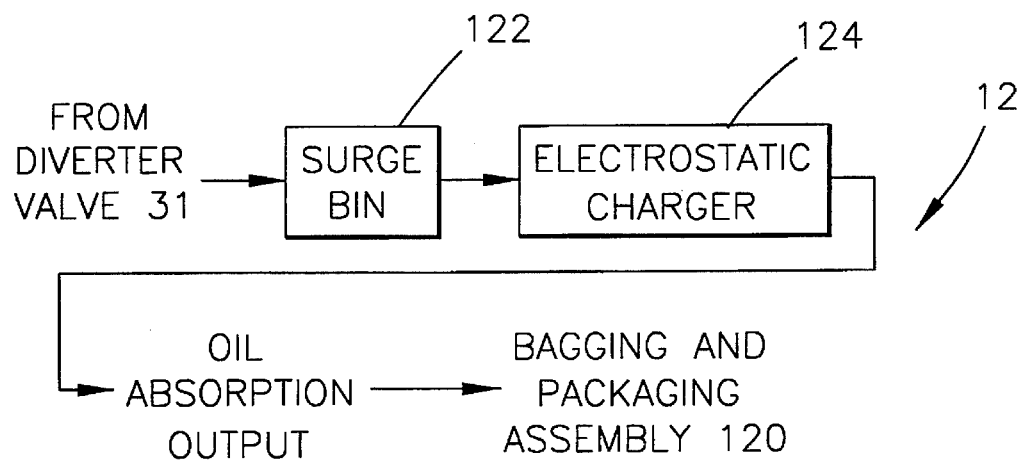
FIG. 7 is a block diagram of a method used to produce oil absorption material according to the teachings of the preferred embodiment of this invention.
FIG. 8 is a seed tray arrangement associated with an experiment illustrating the use of the cellulosic composition of this invention as a germination medium.

Referring now to FIG. 7, there is shown process 121 which is performed on particles 12 as they are output from diverter valve 31 of FIG. 1. In the preferred embodiment of this invention, process 121 is effective to allow the particles to be useful as an oil absorbent.

As shown, the dried particles 12 are output to surge bin assembly 122, which is substantially identical to assembly 102. Alternatively, particles 12 may be first output to the aspirator used by process 100 (FIG. 6) and then to assembly 122. The particles output from assembly 122 are input to an electrostatic changer 124, which comprises approximately twenty feet of plastic piping. As the particles traverse through the piping, they gain an electrostatic charge which Applicant has found to be very beneficial in absorbing oil. The output electrostatically charged particles are then output to the bagging and packaging assembly 120. In this previously described manner, the electrostatic cellulosic composition of this invention may be effectively employed as an oil absorbent.

The effectiveness of the cellulosic composition of this invention as an oil absorbent is due to the fact that both the electrostatic composition and the oil are less dense than water. Hence, it should be apparent to one of ordinary skill in the art that oil, when spilled into water, stratifies in a layer above the water. This stratification phenomenon is especially apparent in sea water, which is generally denser than fresh water.

The electrostatic charge of the cellulosic product attracts oil, which is readily absorbed into the composition. The oil laden composition remains less dense than the underlying water and remains floating on the water. The composition may then be readily collected and placed through a typical and commercially available press in order to obtain the absorbed oil. Afterward, the biodegradable composition may be easily disposed of without polluting the environment, while the absorbed oil may be reused. In this manner, the cellulosic composition of the invention provides a safe and clean way to biodegradably absorb spilled oil, to allow the oil to be reused, and provides substantially no environmental pollution.

Moreover, Applicant has found that the cellulosic composition of this invention in the form of briquette 42 or as loose particles emanating from valve 31 or from screen 64, or from preheater 32, may be effectively used as an oil absorbent without any electrostatic charge, and that briquette formed composition 42 may be used directly as animal excretion and/or oil absorbents, once shredded, ground, or partially fiber reconstituted with ordinary tap water.

To verify the effectiveness of the cellulosic composition of the preferred embodiment of this invention as an oil and/or animal excretion absorbent, the following experiments were performed:

Experiment 1

Approximately 39.6 grams of hydraulic oil was placed onto a typical styrofoam plate. Approximately two-thirds by weight of cellulosic material, which was output from valve 31 (FIG. 1) was added to the plate. Five minutes elapsed and approximately 1.3 grams of oil remained on the styrofoam surface with the remaining oil was absorbed into the material. The same experiment was performed using only cellulosic material obtained by grinding a briquette 42. The result of this experiment were substantially identical to the results of the first experiment set forth above. The same experiment was again performed using one of the briquettes 42 which was combined with approximately ⅓ (by weight) of ordinary tap water. The fiber reconstituted briquette absorbed the oil in a substantially similar manner as set forth above.

Experiment 2

In order to contrast the results of Experiment 1 above to the results associated with a typical clay oil absorbent, approximately 36.95 grams of commercially available SAE 30 hydraulic oil was placed onto a typical styrofoam plate. Approximately 24.39 grams of typical and commercially available clay oil absorbent was placed on the plate and five minutes was made to elapse. Much of the oil remained unabsorbed with approximately only 2% to 3% by weight of the oil were absorbed. Accordingly, a second quantity of clay oil absorbent approximately equaling 24.39 grams was again added to the styrofoam plate and five more minutes elapsed. It was observed that approximately 20% of the oil was absorbed. In successive operations, a quantity of 24.39 grams of typical and commercially clay oil absorbent was successfully added to the plate three more times. The third addition resulted in about 30% of the oil being absorbed; the fourth addition resulted in about 45% being absorbed; the last addition resulted in about 90% of the oil being absorbed. Accordingly, the cellulosic composition of the preferred embodiment of this invention has been experimentally proved to be a much better oil absorbent than typical clay oil.

Experiment 3

Approximately 8 grams of typical tap water was added to a typical and commercially available clear cylindrical jar. Approximately 30 grams of typical and commercially available hydraulic oil was added to the water and approximately 26.2 grams of the cellulosic composition (i.e. a ground briquette 42) of the preferred embodiment of this invention was added to the mixture. No mixing was done. It was observed that the cellulosic composition material floated on top of the oil, absorbing the oil and becoming a substantially clumped mass. Very little of the cellulosic material sank to the bottom of the jar and most of the oil residue, included within the water, was absorbed by tile material. It was further found that water did not replace the absorbed oil which was originally absorbed within the processed cellulosic composition material.

Experiment 4

Approximately 3 ounces of gasoline was added to about 69.2 grams of the cellulosic composition material of the preferred embodiment of this invention (i.e. a ground briquette 42), within a typical container. It was found that the gasoline was quickly and easily absorbed by the material. This experiment was also performed by adding about three ounces of gasoline to about sixteen ounces of tap water. About 69.2 grams of the cellulosic composition of this invention readily absorbed the gasoline from the water.

Experiment 5

Approximately 104.9 grams of typical and commercially available antifreeze was added to approximately 104.9 grams of the cellulosic composition material (i.e. from valve 31) of the preferred embodiment of this invention within a typical glass container. It was found that substantially all of the antifreeze was absorbed by the cellulosic material.

The above-described experiments conclusively show that the cellulosic material of the preferred embodiment of this invention easily absorbs oil, gasoline, and antifreeze material, which may be present within water or freestanding. Moreover, these experiments also conclusively show that the cellulosic composition of the preferred embodiment of this invention absorbs oil much better than existing and commercially available clay absorbing materials. Moreover, the biodegradable nature of the cellulosic composition of the preferred embodiment of this invention further allows the oil to be reclaimed and waste products to be minimized.

(IV). NOURISHMENT COMPOSITION

Applicant has found that the cellulosic composition 42 of this invention may comprise corn, barley, rye, wheat and/or other human or animal or agricultural edible cellulosic materials, and that these materials may be subjected to process 10 (FIG. 1) and be formed into the briquette-shaped product 42.

In this manner, such "briquetted food" may be easily distributed to the poor in third world countries and easily reconstituted into an edible composition by the addition of water and milk. Such briquetting has been found to both allow for easy nourishable and edible food distribution and to extend the useful life of the food relative to its "unbriquetted" form. Thus, such food briquettes may be stored for long periods of time without substantially detrimentally effecting the edibility or nourishment provided. Hence, such food briquettes comprise a safe, efficient and easy way to feed the world's poor or provide a relatively low cost and efficient heat source.

It is to be understood that the invention is not limited to the exact construction or method illustrated and described above, but that various changes and modifications may be made without departing from the spirit and the scope of the invention as defined in the following claims.

We claim:

1. A method for making a cellulosic composition, said method comprising the steps of:

obtaining a quantity of cellulosic particles having a certain moisture content;

heating said quantity of cellulosic particles, effective to remove a certain and predetermined amount of said moisture content therefrom;

pulverizing said partially dried particles;

heating said pulverized and partially dried particles effective to remove a second certain and predetermined amount of said moisture content;

compacting and heating said heated and pulverized particles with a predetermined and certain temperature and with a certain and predetermined compacting force;

separating said heated and pulverized particles into a first group of dust particles and a second group of coarse particles as said heated and pulverized particles are heated to remove said second and predetermined amount of said moisture content;

mixing said separated dust particles with said separated coarse particles; and compacting said mixed dust particles and said coarse particles with a second compacting force effective to produce said cellulosic composition.

2. The method of claim 1, wherein said quantity of cellulosic particles comprises wood.

3. The method of claim 2, wherein said quantity of cellulosic particles comprises maple.

4. The method of claim 2, wherein said quantity of cellulosic particles comprises aspen.

5. The method of claim 1, wherein said quantity of cellulosic particles comprises wheat.

6. The method of claim 1, wherein said quantity of cellulosic particles comprises corn.

7. The method of claim 1, wherein said quantity of cellulosic particles comprises rye.

8. A method for making a cellulosic composition, said method comprising the steps of:

obtaining a quantity of cellulosic particles;

heating said quantity of cellulosic particles, effective to remove a certain and predetermined amount of said moisture content therefrom;

compacting said heated cellulosic particles;

feeding said cellulosic particles at a certain speed to a pair of roll dies; and compacting said cellulosic particles by use of said roll dies at a second speed which is substantially slower than said certain speed, thereby producing said cellulosic composition.

9. The method of claim 8, wherein said cellulosic particles comprise maple.

10. The method of claim 8, wherein said cellulosic particles comprise aspen.

11. The method of claim 8, wherein said cellulosic particles comprise oak.

12. The method of claim 8, wherein said cellulosic particles comprise corn.

13. The method of claim 8, wherein said cellulosic particles comprise wheat.

14. The method of claim 8, wherein said cellulosic particles comprise rye.

15. A cellulosic composition which is formed by initially compacting and concurrently heating a quantity of cellulosic particles at a first temperature and a first pressure and thereafter compacting and heating said quantity of cellulosic particles at a second temperature and at a second pressure.

16. The composition of claim 15, wherein said particles comprise wood.

17. The composition of claim 15, wherein said particles comprise oak.

18. The composition of claim 15, wherein said particles comprise rye.

19. The composition of claim 15, wherein said particles comprise corn.

20. The composition of claim 15, wherein said particles comprise maple.

* * * * *